Nov. 29, 1960 J. R. HORSCH 2,962,700

MAGNETIC COUNTER

Filed June 1, 1955

INVENTOR:
JAMES R. HORSCH,
BY George V. Eltgroth
HIS ATTORNEY.

United States Patent Office 2,962,700

Patented Nov. 29, 1960

2,962,700

MAGNETIC COUNTER

James R. Horsch, East Syracuse, N.Y., assignor to General Electric Company, a corporation of New York Filed June 1, 1955, Ser. No. 512,480

11 Claims. (Cl. 340—174)

This invention relates to signal responsive networks utilizing ferromagnetic cores, and more particularly to networks of this class which display counting properties.

Numerous networks and configurations have been devised which are intended to exhibit different responses to the members of a group of sequentially-applied signals. Most networks of this nature heretofore are characterized by the presence of "active" devices, which is to say devices which are recognized as normally having the capacity of delivering a signal-controlled output which is greater than the power inherent in the controlling signal. Electron tube amplifiers, dielectric amplifiers and magnetic amplifiers are typical of such active devices. A common characteristic of devices of this nature is the necessity for the existence of some exciting source, such as the anode supply for an electron tube amplifier, and carrier or auxiliary frequency energy required for the operation of dielectric and magnetic amplifiers.

Reliance on such exciting sources results in "volatility" of the counter contents, which is to say that the information relative to an intermediate state of the counter is lost upon failure of the auxiliary exciting power supply. While volatility has been recognized as a direct functional disadvantage, another undesired aspect is the inconvenience of providing such an auxiliary supply and the appreciable standby energy dissipation of such active devices at all times, whether or not a signal be applied. These tend to increase the size and weight of counting apparatus to an undesired degree, preventing its use in many applications.

A further disadvantage of most exciting counting systems arises in connection with reset to reference condition. It is customary to provide separate reset lines and reset networks apart from the normal signal input channels for the purpose of setting the counters back to their reference state or configuration of states. When the counting elements are situated at different locations and interconnected by cables, it is found that considerable wiring complexity is introduced by the necessity for the additional conductors and that cross-talk problems between the signal and reset circuits must receive careful attention. These problems often impose objectionable limitations on the flexibility with which a system may be broken up into component parts for convenient distribution adjacent different points of utilization.

Accordingly, it is an object of my invention to provide a novel counting element employing a magnetic core having a substantially rectangular hysteresis loop which will exhibit an improved signal to noise ratio in an associated output circuit.

Another object of my invention is to provide such an element which may be readily cascaded to form a counting network.

A further object of my invention is to provide such an element or network which may readily be reset by impulses arriving via the signal channel.

For additional objects and advantages, and for a better understanding of the invention, attention is now directed to the following description and accompanying drawings. The novel features of the invention are particularly pointed out in the appended claims.

In the drawings:

Figure 1 illustrates a simple network incorporating a ferromagnetic circuit, which displays counting properties.

Figure 2*a* illustrates as a volt-time waveshape signal impulses which may be applied to the input circuit of Figure 1.

Figure 2*b* illustrates the waveshape of the voltage impulses observed in the resistance including branch circuit of Figure 1 in response to the applied impulses of Figure 2*a*.

Figure 2*c* illustrates the voltage impulses appearing in the capacitor including branch of Figure 1 in response to applied impulses as represented in Figure 2*a*, for a particular relationship of the parameters in the network of Figure 1.

Figure 2*d* illustrates the voltage observed in the capacitor including branch of the network of Figure 1 in response to the application of impulses of the form of Figure 2*a* with different network parameters.

Figure 2*e* illustrates the voltage impulses observed in the capacitor including branch of the network of Figure 1 in response to voltage impulses having the waveshape of Figure 2*a* with a still different set of network parameters.

While particular configurations have necessarily been chosen for convenience in illustration and discussion, it is to be noted that the principles of the invention may be advantageously applied in networks and environments different from the illustrations, but which still embody the essence of the invention.

Figure 1:
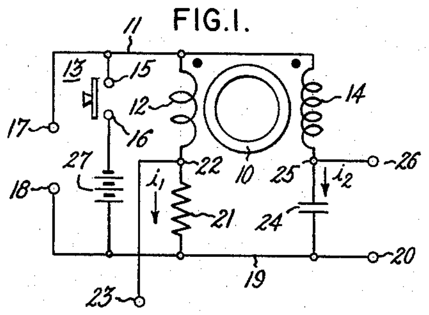

Referring now in detail to Figure 1 of the drawings, there appears the ferromagnetic circuit 10, which may be of annular form, although any other mechanical configuration providing an effectively closed magnetic circuit, or one with negligible air-gap influence, may be employed. The material in the magnetic circuit 10 may be any magnetic substance having appreciable remanence. In the present state of the art, materials in which the B–H characteristic is substantially rectangular in form have been found useful, as for example, the nickel-iron alloys designated in the trade as Orthonol, Permalloy and Delta-max. Windings 12 and 14 are wound upon the magnetic circuit 10 and link with the magnetic flux traversing this circuit. One end of each of the windings 12, 14 is connected over the common conductor 11, to the input terminal 17. The conductor 11 is also connected with the contact 15 of the single-pole, momentary contact switch 13. In the arrangement shown, the number of turns in the winding 14 should be greater than the number of turns in the winding 12, although this is not mandatory if a pulse of similar waveform and larger amplitude is independently available for application to the series connected winding 12 and resistance 21.

In order to apply independent waveforms the two branch circuits containing the windings 12 and 14 would not be connected in parallel as shown but rather to sources of different amplitude, for instance different points on a potential divider.

The other input terminal 18 is connected with the line 19, which extends to a common output terminal 20. The free end of the winding 12 is connected to the line 19 through the resistor 21 and the junction 22 between the resistance 21 and winding 12 is connected with an output terminal 23. The free end of the winding 14 is connected with the line 19 through capacitor 24, and the junction 25 between winding 14 and capacitor 24 is connected with an output terminal 26. A source of potential, represented by the battery 27, is connected between the line 19 and contact 16 of the single pole momentary contact switch 13, earlier referred to. The signal pulses driving the network of Figure 1 are applied between input terminals 17, 18. These pulses may have a waveshape, plotted as voltage against time, such as that illustrated in Figure 2*a*.

In a particular embodiment, the core 10 consisted of ten wraps of ⅛ mil 4–79 Permalloy, the winding 12 ($N_1$) consisted of 60 turns wrapped about the core 10, the winding 14 ($N_2$) had 90 turns wrapped about the core 10, the capacitor 24 had a value of .001 mfd., and the resistance 21 had a value of approximately 175 ohms. The input impulses illustrated in Figure 2*a* were from 0.2 to 0.5 microseconds in width and had an amplitude of 20 to 50 volts.

Figures 2A, 2B, 2C, 2D, 2E:
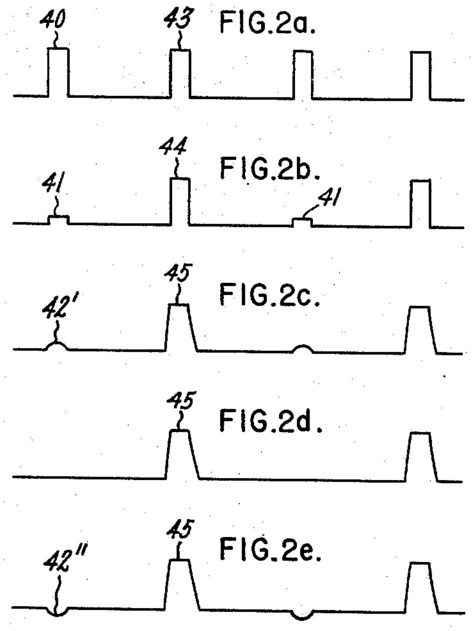

When operated under these conditions, the voltage waveform appearing across the resistance 21 approximates the representation of Figure 2*b*, and the voltage waveforms appearing across the capacitor 24 of Figure 1 are as illustrated in Figure 2*d*. The windings 12 and 14 are so poled that, upon application of an impulse between terminals 17 and 18, winding ends 22 and 25 will exhibit the same polarity of voltage relative to line 11. An increase in the value of the resistance 21 gives rise to a voltage waveform across capacitor 24 corresponding to Figure 2*c*, while reduction in the value of resistance 21 produces waveforms across the capacitor 24 resembling those in Figure 2*e*.

Figure 7:
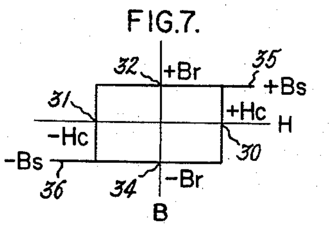
Figure 7 illustrates an idealized B–H relationship for the ferromagnetic circuit which is particularly advantageous in the practice of the principles of the invention.

It will be noted, in Figures 2*b*, 2*c*, 2*d*, and 2*e*, that alternate pulses appearing between input terminals 17, 18 give rise to output signals across resistor 21 or capacitor 24 of considerable amplitude, while the remaining input impulses produce either very low output amplitudes or, in the case of Figure 2*d*, none at all. The operation of a single winding on a ferromagnetic core in series with a capacitor, as represented by winding 14 and capacitor 24 in Figure 1, is readily understood upon a qualitative basis. The magnetic circuit 10 has a substantially rectangular B–H characteristic, such as shown in Figure 7. In Figure 7, the H axis intercepts 30, 31 represent respectively $+H_c$ and $-H_c$, while the B axis intercepts 32, 34 represent respectively $+B_r$ and $-B_r$ where these designations have the significance given them in the work entitled "Magnetic Circuits and Transformers," published in 1947 by John Wiley & Sons, Inc. The flux densities corresponding respectively to the points 35, 36 on the B–H characteristic of Figure 7 may be designated respectively as $+B_s$ and $-B_s$.

For the purpose of this explanation, it may be assumed that the winding 12 and resistor 21 are not in the circuit of Fig. 1 and that, initially, the flux in the core 10 of Figure 1 is at the $-B_r$ level, and that current flow occuring in the winding 14 in response to the application of signal impulses to the input terminals 17, 18 tends to change the magnetic state of the core 10 to the $+B_r$ level.

Neglecting for the moment the effect of the capacitance connected in series with the winding 14, the flux conditions existing in the ferromagnetic core may be expressed by the relationship:

$$\Delta\phi=\frac{1}{N_2}\int_0^{\Delta t} E\,dt$$

where $\Delta\phi$=change in magnetic flux
$N_2$=number of turns in winding 14
$E$=voltage expressed as $f(t)$
$\Delta t$=time of voltage application The winding 14 connected between the terminals 17, 18 exhibits a high impedance, so long as the flux in the core 10 lies within the range:

$$-AB_r<\phi<+AB_r \tag{2}$$

where A equals the cross-sectional area of core 10.

Therefore, since the reference core condition was $-B_r$, so long as $$\Delta\phi<2AB_r \tag{3}$$

relatively little current will flow through the winding 14. As the network is intended to function as a counter, the parameters are chosen so that:

$$\int E\,dt<2N_2B_rA \tag{4}$$

in the time interval embracing a single pulse.

The application of a succession of pulses ultimately results in:

$$\int E\,dt=2AN_2B_r \tag{5}$$

whereupon considerable current is passed by the winding to charge capacitor 24 and provide an output indication. By making $$\int^{\Delta t} E\,dt$$

sufficiently small, it is possible to obtain this indication on the second, third, fourth or nth pulse, as desired. Discharge of capacitor 24 then resets the core to the $-B_r$ state.

The actual network of Figure 1, however, with both windings 12, 14, represents a substantial improvement over a single coil wound on a ferromagnetic core, since it reduces the effect of the magnetizing current flowing during the pulse periods when an operating response is not desired, and considerably increases the ratio of output pulse magnitude for terminal and intermediate counts.

The network of Figure 1 may be described by the differential equations:

$$E=N_1\frac{d\phi}{dt}+Ri_1 \tag{6}$$

$$E=N_2\frac{d\phi}{dt}+\frac{1}{C}\int_0^t i_2\,dt \tag{7}$$

Where R is the resistance of resistor 21, C is the capacitance of capacitor 24, and $i_1$ and $i_2$ are the currents through resistor 21 and capacitor 24 respectively.

While the core is unsaturated, $$N_1i_1+N_2i_2=LH_c \tag{8}$$

where L is the path length of core 10 because a rectangular hysteresis loop has been assumed.

$q_2$, the charge on C, is given by:

$$q_2=\int_0^t i_2\,dt \tag{9}$$

After substituting 9 in 7, subtracting 7 from 6, we have $$\frac{RN_2}{N_1}\frac{dq_2}{dt}+\frac{N_1}{CN_2}q_2=\frac{RLH_c}{N_1}+\left(\frac{N_1-N_2}{N_2}\right)E \tag{10}$$

This equation is first order $q_2$ and its solution is the exponential:

$$q_2=\left[\frac{RLH_c}{N_1}+\left(\frac{N_1-N_2}{N_2}\right)E\right]\left(1-e^{-\frac{N_1^2}{RCN_2^2}t}\right) \tag{11}$$

Therefore, so long as the flux in the core 10 does not exceed $+B_r$, the voltage appearing across the capacitor C is zero if:

$$(12) \qquad \frac{RLH_c}{N_1}+\left(\frac{N_1-N_2}{N_2}\right)E=0$$

Equation 12 represents the ideal adjustment of circuit parameters, which gives rise to the output wave shown in Figure 2*d* across the capacitor 24 in Figure 1. In practice, the parameters may vary from one assembly to the next, so that the ideal relationship of Equation 12 may not be precisely satisfied. When the maladjustment in parameters gives rise to a positive value in Equation 12, there may result an output wave such as illustrated in Figure 2*c*, while when the parameter irregularities give rise to a negative result for Equation 12, an output wave such as shown at Figure 2*e* may appear across the capacitor 24.

Operation of the network of Figure 1 may be described qualitatively in the following fashion, again assuming the magnetic state of the core 10 at the beginning of the sequence to be $-B_r$. When a train of pulses such as shown at 40 in Figure 2*a* is applied between the input terminals 17, 18, a magnetizing current flows through the winding 12 and resistance 21. The turns ratio between winding 12 and winding 14 is such that the voltage induced in the winding 14 by reason of the flow of magnetizing current through winding 12 and resistance 21 is substantially equal to the voltage impressed between terminals 17, 18, whereby there is no net voltage available in the branch circuit including winding 14 in series with capacitance 24 to cause the flow of current therethrough. Accordingly, no charge is stored on capacitance 24 and no voltage appears thereacross. With the application of each electric impulse to the network, the flux level in the core is changed positively in increments corresponding to $\int E dt$. So long as the flux level in the core is less than $+B_r$, the operation takes place in the manner above described. After the application of a sufficient number of pulses to bring the flux in the core 10 to a value of $+B_r$, the winding 12 is effectively decoupled from the winding 14, whereby no opposing voltage now prevents the flow of current into the capacitor 24. A pulse applied at this time traverses the windings 12, 14 to produce an electric impulse of relatively large magnitude across the resistance 21 and across capacitor 24.

Referring now in more detail to Figure 2, the electric pulses 41 in Figure 2*b*, represent the voltage drop appearing across resistance 21, corresponding to the relatively low value of magnetizing current flowing through winding 12 while the unsaturated condition prevails. With the arrival of the next pulse succeeding the saturation of the core 10, a much larger current flows giving rise to an impulse 44 of much greater magnitude across resistance 21.

While the core is in the unsaturated state, relatively little current flows into the capacitor 24, so that ideally, as in Figure 2*d*, the impulse 40 does not result in the appearance of any appreciable voltage across the capacitor 24. As outlined previously, however, irregularities in the relationships between the network parameters may permit the appearance of a relatively small voltage, as indicated at 42' and 42'' in Figures 2*c* and 2*e* respectively in response to the voltage impulse 40.

After the core 10 has been driven to the $+B_r$ condition, the next succeeding pulse to arrive, indicated at 43 in Figure 2*a*, results in the passage of a very substantial current impulse through the windings 12, 14 to develop a large amplitude voltage indicated at 44 in Figure 2*b* across the resistance 21, and to charge the capacitor 24 to a substantial voltage as indicated at 45 in Figure 2*c*, Figure 2*d*, and Figure 2*e*. With the ending of the input impulse, the charge on capacitor 24 gives rise to a reverse current flow into winding 14 which resets the core to the $-B_r$ state, preparing the core 10 for the next cycle of operation.

At the beginning of the counting operation, it is desirable that the core 10 be definitely placed in a predetermined $B_r$ state. This is achieved by setting the input switch to bring the movable member of switch 13 into engagement with the fixed contacts 15, 16, whereupon the source 27 charges the capacitor 24, and the disengagement of the contacts 15, 16 permits the discharge of the capacitor 24 to reset the core 10 in a manner previously described.

To simplify the foregoing explanation, the magnetic circuit 10 was described as being driven between $-B_r$ and $+B_r$. It is not necessary, however, that the operating cycle start with the core in the $-B_r$ state, but only that the remanent flux density be less than $+B_r$ and that $\int E dt$ for the individual impulse be less than that required to drive the magnetic circuit from the reference flux density to $+B_r$. Since a lower impulse value of $\int E dt$ reduces the spread between $+B_r$ and the reset flux density, at the same time that it reduces the increments of flux density during the count-up operation, the counting action of the assembly is not seriously affected by variations in impulse $\int E dt$ of as much as 4:1 or 5:1, so that the voltage of the driving impulse may vary considerably without loss in counting accuracy.

According to Equation 12 it might be anticipated that the ratio of desired to undesired output signal would suffer with change in $\int E dt$ caused by variation in E. It has been found experimentally, however, that $H_c$ increases with increasing flux wave front steepness, and that, accordingly, the relation of Equation 12, once established in the initial choice of design parameters, remains satisfied over a wide range of driving impulse voltages.

Figure 3:
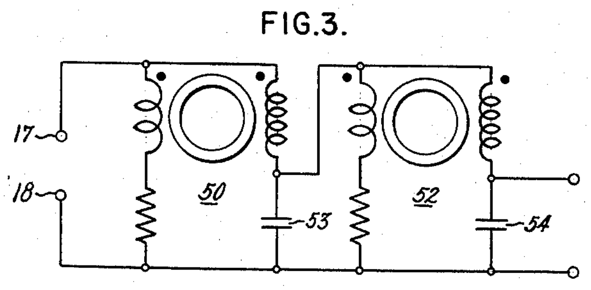
Figure 3 illustrates schematically a cascade-connected arrangement of a number of networks similar to that shown in Figure 1.

While the network of Figure 1 may be used for counting with various scaling factors, the magnitude of the scaling factor is limited by the tolerance restrictions imposed upon the network parameters and upon $\int E dt$. In practice, it may be undesirable to impose restrictions which would be required to obtain scaling factors of four or more. When counting of a higher order is required, two such networks may be connected in cascade, as shown in Figure 3, where the output of the first counting stage 50, appearing across capacitor 53, serves as the input signal for counting stage 52 delivering output signals across the capacitor 54. The number of elements in this cascaded chain may be extended at will, subject only to the consideration that the later elements in the chain may require design parameters adapted to match the diminishing energy content of pulses propagated through the chain.

Figure 4:
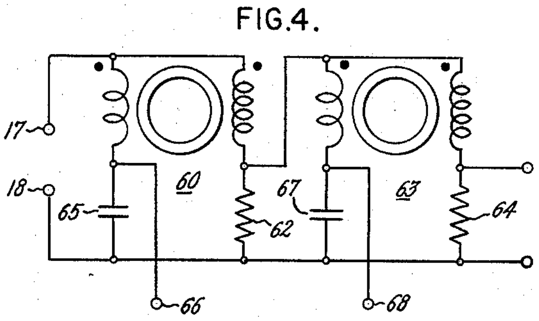
Figure 4 illustrates another method of cascade-connecting networks of the type shown in Figure 1.

It is to be noted that the voltage impulse 44 appearing across the resistance 21 is a more faithful replica of the input voltage impulse 43 in Figure 2*a* than is the voltage impulse 45 appearing across capacitor 24, as shown in Figure 2*d*. When a long counting chain is employed, this progressive degradation of the impulse waveshape from stage to stage may undesirably influence the reliability of operation. This may be avoided, by cascade connecting the successive counter stages by use of the resistor as the coupling element. This technique is illustrated in Figure 4 where the output voltage of counting stage 60, appearing across resistance 62, serves as the input signal to the counting stage 63, which delivers an output signal across resistance 64, each of said resistances being connected in series with an associated winding as shown in Figure 1. When the resistance-linking technique of Figure 4 is used in cascade connecting the successive stages of a counter made up of the networks described herein, the chain may be extended to considerably greater length without objectionable deterioration of the waveform. As earlier noted in connection with Figure 3, the design parameters of the succeeding stages must be modified in long chains to make proper use of the progressively diminishing energy in the driving impulses, Intermediate signals may be taken off of the various stages by connection to the respective counting stage capacitors. This is illustrated in Figure 4 by the connection of an output line 66 with capacitor 65 in the counter stage 60 and by the connection of an output lead 68 with capacitor 67 in the counter stage 63.

The network of Figure 3 and the network of Figure 4 may each be reset by the application of a unidirectional potential, or a voltage impulse of sufficiently long duration between input terminals 17, 18. In Figure 3 the application of such a reset stimulus charges the capacitors 53, 54, so that when the resetting signal terminates, the respective capacitors restore the cores associated with the individual capacitor windings of the counter stages to the $-B_r$ condition.

Resetting of the counter chain of Figure 3 is satisfactory, so long as the resistance of the capacitor-connected windings is low, since the resistance used in the other branch of the counting network is usually quite large by comparison therewith.

There is somewhat greater loss of the resetting signal in Figure 4, since the winding through which the reset-conditioning current must pass will always carry the current to one more stage than in Figure 3.

Figure 5:
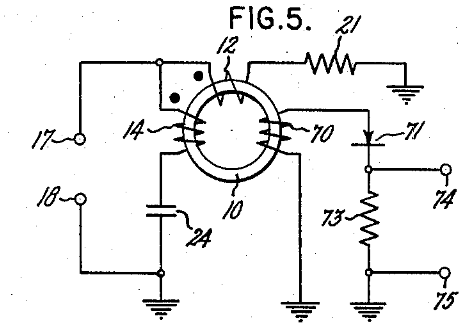
Figure 5 illustrates an alternative method of deriving signals for the counting network.

Circumstances may often arise in which it is desired to have electrical isolation for direct current, or low frequency, components between the counter driving circuits and the output circuits. The network schematically illustrated in Figure 5 has this property. The reference characters used in this Figure 5 are identical with those employed in Figure 1, where identical parts are designated. As shown, windings 12, 14 and 70 may be wound on the closed magnetic circuit represented by the annular ring 10 having a substantially rectangular B–H characteristic as aforesaid. The winding 14 is connected across the input terminals 17, 18 in series with capacitor 24, and winding 12 is connected across the said input terminals 17, 18 in series with resistance 21. These portions of the network function in the manner earlier described. One terminal of the winding 70 may be connected with an output terminal 75 through ground, while the other terminal is connected with one electrode of the asymmetrical conductor 71, whose other electrode is connected with the output terminal 74. A resistance 73 bridges the output terminals 74, 75.

Signals which render the ungrounded lead of winding 70 positive with respect to ground pass through the asymmetrical conductor 71, which may be any of the well-known types of diodes, while signals which render the ungrounded lead of winding 70 negative with respect to ground do not pass through the diode 71 to the output terminal 74. If this discrimination is not required, then the diode 71 may be omitted and a direct connection made.

Figure 6:
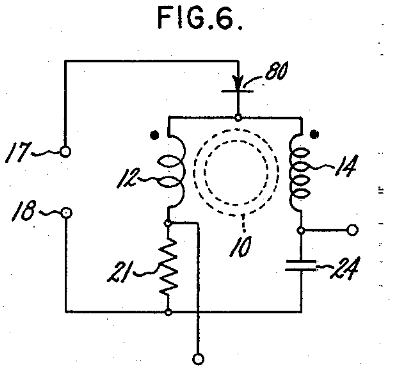
Figure 6 illustrates schematically an arrangement for reducing reaction between the source and counting network.

Referring once more to the network shown in Figure 1, it will appear that transients resulting from the discharge of the capacitor 24 after it has been charged by a counted impulse may be transmitted back into the source via terminals 17, 18 and react over this path with other apparatus fed from the same suorce. Figure 6, in which identical reference characters are used for parts corresponding identically with those present in Figure 1, shows the interposition of a diode 80 between the input terminal 17 and the common line feeding windings 12, 14. Currents circulating within the loop including windings 12, 14 are now isolated from the exciting circuit by reason of the asymmetrical conducting properties of the diode 80. As before, output signals may be taken, optionally, from either resistance 21 or capacitor 24. While positive-going impulses have been used throughout, for uniformity of explanation, it is quite apparent the negative-going impulses may also be optionally employed. In such event, it may be desirable to reverse the connection polarity of any asymmetrical conductors used.

While the principles of the invention have now beei made clear in illustrative embodiments, there will be immediately obvious to those skilled in the art many modifications in structure, arrangement, proportions, the elements and components used in the practice of the invention, and otherwise, which are particularly adapted for specific environments and operating requirements, without departing from those principles. The appended claims are, therefore, intended to cover and embrace any such modifications, within the limits only of the true spirit and scope of the invention.

What I claim as new and desire to secure by Letters Patent of the United States is:

1. In combination, a first electric circuit including an electric winding and resistance effectively in series connection, a second electric circuit including an electric winding and capacitor effectively in series connection, a magnetic core of a material having appreciable remanence common to said windings, a source of electric signals comprising individual signal elements having a $\int E dt$ less than that required to reversely saturate said core electrically connected to each of said first and second circuits for direct excitation thereof and said windings having a turns ratio such that the magnetizing current flowing through said first circuit while said magnetic core is unsaturated induces a voltage in said winding of said second circuit sufficient to substantially cancel the voltage applied to said second circuit from said source.

2. The combination of, a first electric core including an electric winding having $N_1$ turns and an effective series resistance of R ohms, a second electric circuit including an electric winding having $N_2$ turns and an effective series capacitor of C farads, a magnetic core of a material having appreciable remanence common to said windings and characterized by a length $l$ cm. and coercive force $H_c$ oersteds, and a source of electric signals comprising individual signal elements predominantly rectangular in form when plotted as voltage against time characterized by a peak value V volts electrically connected to said first and second electric circuits for excitation thereof, in which the proportioning of the parameters is selected to make $RN_2H_cl$ nominally equal to $N_1V(N_2-N_1)$.

3. In combination, a first electric circuit including an electric winding and resistance effectively in series connection, a second electric circuit including an electric winding with a number of turns exceeding the number of turns in said first electric winding and a capacitor effectively in series with said second electric winding, a magnetic core of a material having appreciable remanence common to said windings, and a source of electric signals electrically connected to each of said first and second electric circuits for excitation thereof.

4. In combination, a magnetic core of a material having appreciable remanence, a first circuit including an electric winding inductively coupled to said magnetic core and connected to a resistance, a second circuit including an electric winding having a number of turns exceeding the number of turns in said first electric winding and an effective series connected capacitance inductively coupled to said magnetic core, means electrically connecting said first and second circuits in parallel, and asymmetrical conducting means for connecting said parallel combination with a source of electric signals.

5. In counting apparatus, a magnetic core of a material having a substantially rectangular B–H characteristic, an electric winding inductively coupled to said magnetic core, a capacitor connected in series with said electric winding, a source delivering electric signals comprising individual elements having $\int E dt$ less than that required to change the state of said magnetic core from saturation in one sense to saturation in the reverse sense when applied across the circuit comprising said series connected winding and capacitor, means impressing signals from said source across the circuit comprising said series connected winding and capacitor, and a second winding electrically connected to said source for developing in said first electric winding an opposing potential substantially equal to the potential impressed on the circuit including said electric winding while the state of said magnetic core is changing from saturation in said one sense to saturation in said reverse sense.

6. In counting apparatus, a magnetic core of a material having a substantially rectangular B–H characteristic, first electric winding inductively coupled to said magnetic core, a capacitor connected in series with said electric winding, a source delivering electric signals comprising individual elements having $\int E dt$ less than that required to change the state of said magnetic circuit from saturation in one sense to saturation in the reverse sense when applied across the circuit comprising said series connected first winding and capacitor, and means electrically connected to said source comprising a second electric winding inductively coupled to said magnetic core for developing in said first electric winding an opposing potential substantially equal to the potential impressed on the circuit including said first electric winding while the state of said magnetic core is changing from saturation in said one sense to saturation in said reverse sense.

7. In combination, a magnetic core of a material having a substantially rectangular B–H characteristic, a first electric circuit including a first electric winding inductively coupled to said magnetic core and connected to a resistance, a second electric circuit including a second electric winding inductively coupled to said magnetic core and connected to a capacitor, a source of electric signals, means for impressing signals controlled by said source directly on said first and second electric circuits, and said windings having a turns ratio such that the magnetizing current flowing through said first circuit while said magnetic core is unsaturated induces a voltage in said winding of said second circuit sufficient to substantially cancel the voltage applied to said second circuit from said source, a third electric winding inductively coupled to said magnetic core, and means for connecting said third electric winding with a work circuit.

8. In combination, a magnetic core of a material having a substantially rectangular B–H characteristic, a first electric circuit including a first electric winding inductively coupled to said magnetic circuit and connected to a resistance, a second electric circuit including a second electric winding inductively coupled to said magnetic circuit and connected to a capacitor, a source of electric signals, means for impressing signals controlled by said source directly on said first and second electric circuits, and said windings having a turns ratio such that the magnetizing current flowing through said first circuit while said magnetic circuit is unsaturated induces a voltage in said winding of said second circuit sufficient to substantially cancel the voltage applied to said second circuit from said source, a third electric winding inductively coupled to said magnetic core, and asymmetrically conducting means for connecting said third electric winding with a work circuit.

9. In combination, a first pair of branch circuits comprising a first electric circuit including an electric winding and resistance effectively in series connection, a second electric circuit including an electric winding and a capacitor effectively in series connection, and a first magnetic core of a material having appreciable remanence common to said windings in said first pair of branch circuits; means for substantially simultaneously applying signal potentials of substantially like waveforms to said first pair of branch circuits; a second pair of branch circuits comprising a first electric circuit including an electric winding and resistance effectively in series connection, a second electric circuit including an eletcric winding and a capacitor effectively in series connection, a second magnetic core of a material having appreciable remanence common to said windings in said second pair of branch circuits; and means for applying signals derived from one of said first branch circuits substantially simultaneously to said second branch circuits.

10. In combination, a first pair of branch circuits comprising a first electric circuit including an electric winding and resistance effectively in series connection, a second electric circuit including an electric winding and a capacitor effectively in series connection, and a first magnetic core of a material having appreciable remanence common to said windings in said first pair of branch circuits; means for substantially simultaneously applying signal potentials of substantially like waveform to said first pair of branch circuits; a second pair of branch circuits comprising a first electric circuit including an electric winding and resistance effectively in series connection, a second electric circuit including an electric winding and a capacitor effectively in series connection, and a second magnetic core of a material having appreciable remanence common to said windings in said second pair of branch circuits; and means for applying signals derived from the resistance including member of said first branch circuits to said second branch circuits.

11. In combination, a first pair of branch circuits comprising a first electric circuit including an electric winding and resistance effectively in series connection, a second electric circuit including an electric winding and a capacitor effectively in series connection, and a first magnetic core of a material having appreciable remanence common to said windings in said first pair of branch circuits; means for substantially simultaneously applying signal potentials of substantially like waveform to said first pair of branch circuits; a second pair of branch circuits comprising a first electric circuit including an electric winding and resistance effectively in series connection, a second electric circuit including an electric winding and a capacitor effectively in series connection, and a second magnetic core of a material having appreciable remanence common to said windings in said second pair of branch circuits; and means for applying signals derived from the capacitor including member of said first branch circuits to said second branch circuits.

References Cited in the file of this patent

UNITED STATES PATENTS

| | | |
|---|---|---|
| 2,697,825 | Lord | Dec. 21, 1954 |
| 2,710,928 | Whitney | June 14, 1955 |
| 2,713,674 | Schmitt | July 19, 1955 |
| 2,713,675 | Schmitt | July 19, 1955 |
| 2,777,098 | Duffing | Jan. 8, 1957 |
| 2,808,578 | Goodell | Oct. 1, 1957 |

FOREIGN PATENTS

| | | |
|---|---|---|
| 730,165 | Great Britain | May 18, 1955 |

OTHER REFERENCES

"A Magnetic Scaling Circuit" by Hertz, Journal of Applied Physics, vol. 22, January 1951 (7A), pp. 107–108 (7A).

"Multi-Stable Magnetic Memory Techniques" (Goodell et al.), Radio News, December 1951, pp. 3 to 5.

Siemens Zeitschrift, vol. 26, April 1952, pp. 140 to 144.

UNITED STATES PATENT OFFICE

CERTIFICATION OF CORRECTION

Patent No. 2,962,700 November 29, 1960

James R. Horsch

It is hereby certified that error appears in the above numbered patent requiring correction and that the said Letters Patent should read as corrected below.

Column 8, line 28, for "core" read -- circuit --; column 10, line 3, for "eletcric" read -- electric --.

Signed and sealed this 23rd day of May 1961.

(SEAL)
Attest:

ERNEST W. SWIDER
Attesting Officer

DAVID L. LADD
Commissioner of Patents